Figure 1:
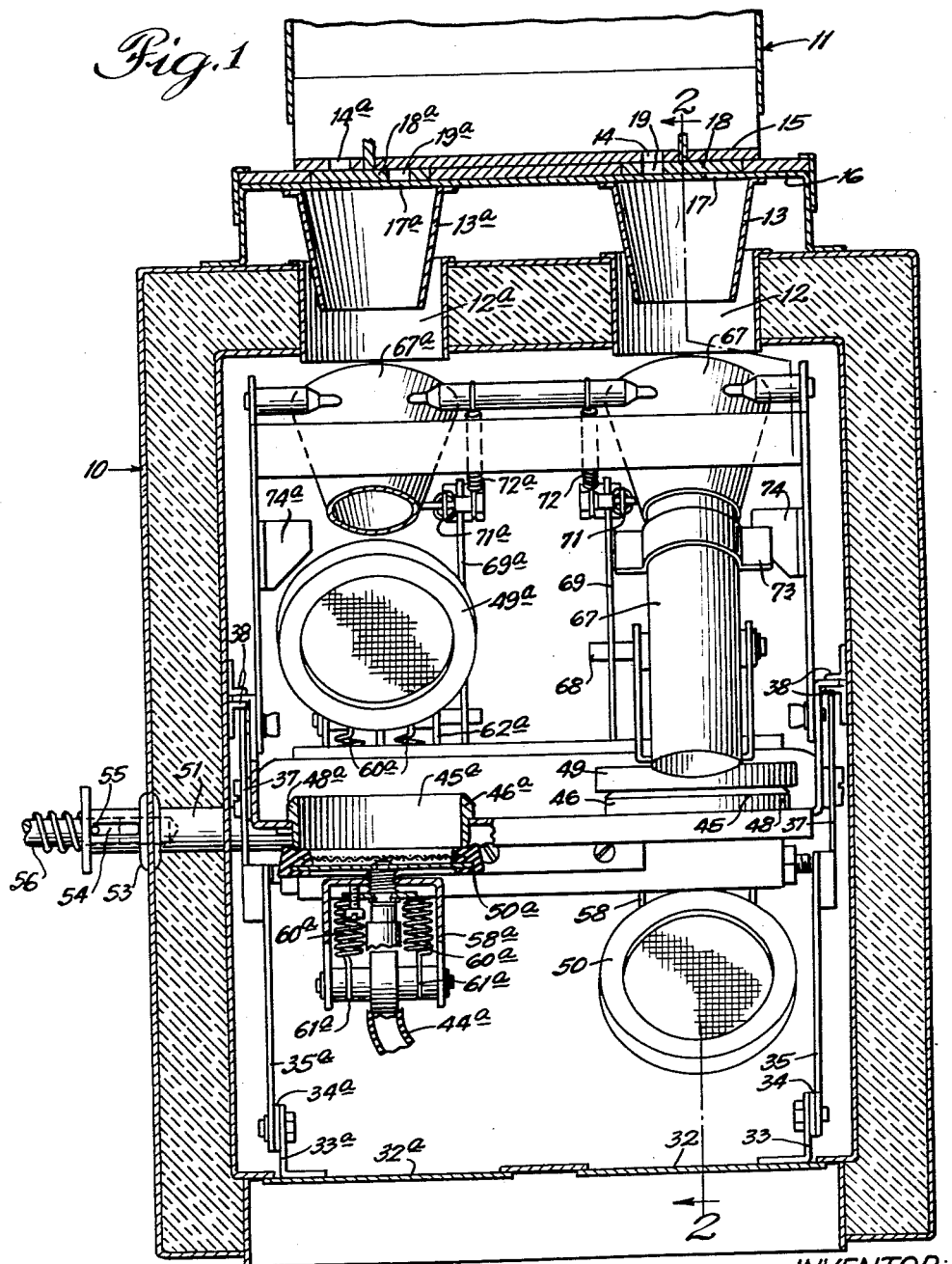

April 5, 1960

J. A. TOTTEN 2,931,288

COFFEE-BREWING APPARATUS

Filed July 21, 1958

3 Sheets-Sheet 1

INVENTOR:
John A. Totten,

BY Dawson, Tilton, Fallon & Lungmus,
ATTORNEYS.

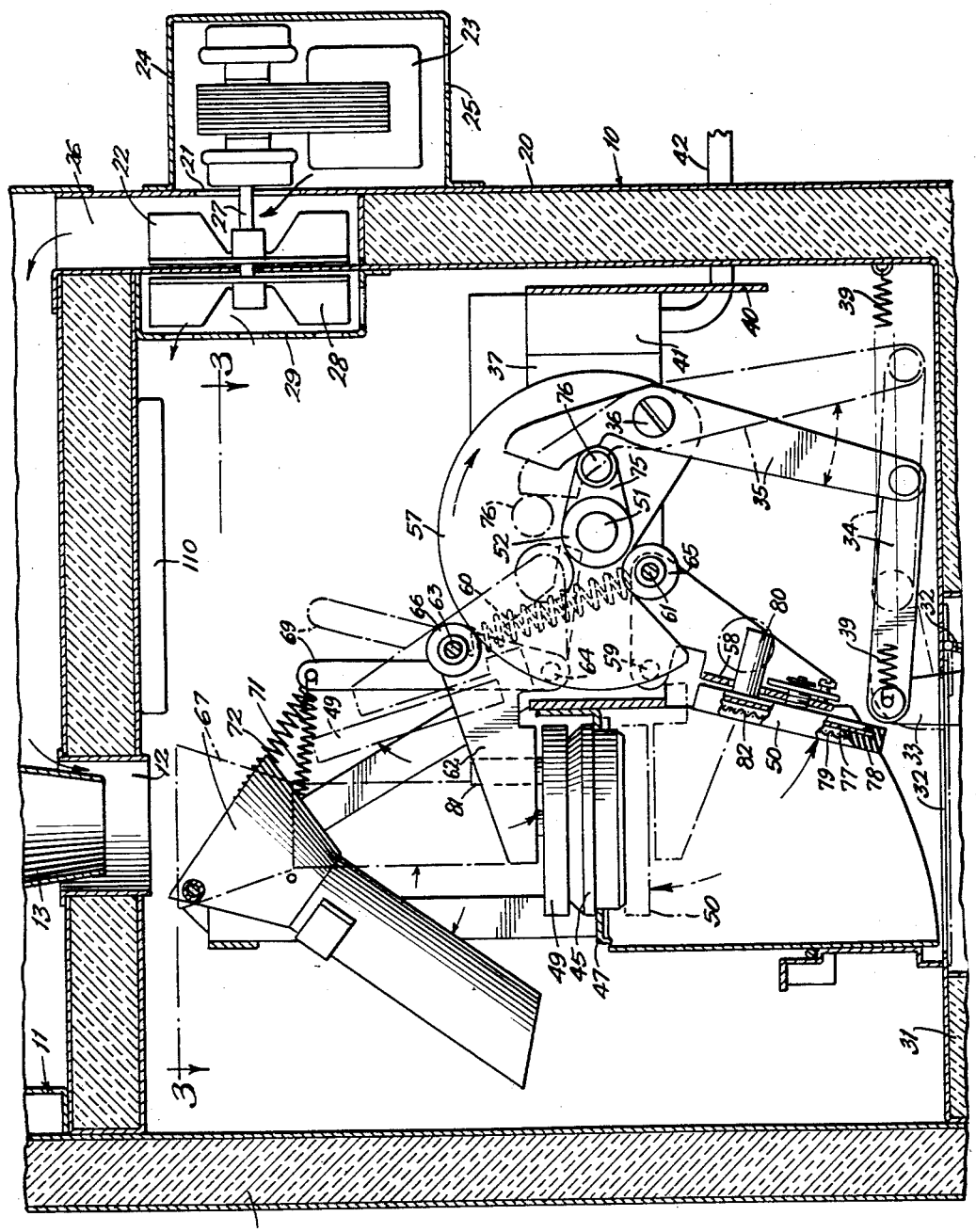

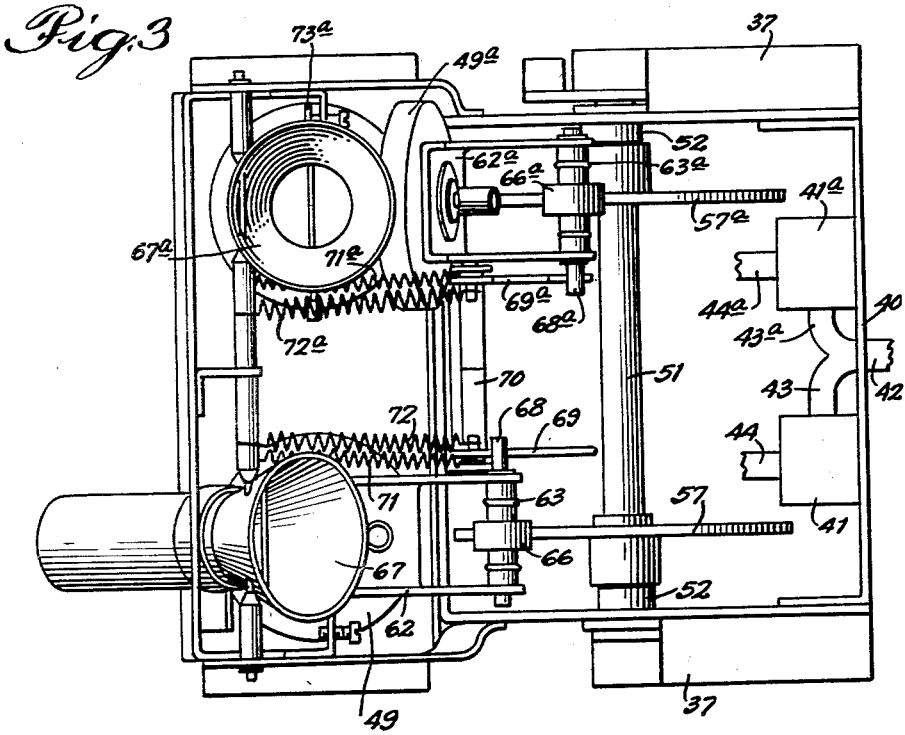

United States Patent Office 2,931,288
Patented Apr. 5, 1960

2,931,288
COFFEE-BREWING APPARATUS

John A. Totten, Hammond, Ind., assignor to Industrial Vendors, Inc., Hammond, Ind., a corporation of Indiana Application July 21, 1958, Serial No. 749,929

10 Claims. (Cl. 99—289)

This invention relates to coffee-brewing apparatus and, more particularly, to coffee-brewing apparatus adapted to brew single-cup quantities of coffee.

The apparatus of this invention has utility in connection with automatic coffee-vending machines such as are found in factories, offices, depots, etc. In those installations, a coin is inserted into the machine and a cup of coffee is dispensed. A principal drawback of existing machines lies in the fact that they are limited to the brewing of several cups of coffee simultaneously so that the excess coffee brewed must be stored for dispensing at a later time. This means, of course, that several purchasers are provided with coffee that has been standing in the brewed coffee reservoir for some time. Attempts have been made to overcome this problem through the use of "instant" coffee, but many purchasers discriminate against such coffee so that this expedient has not proven satisfactory. The problem facing those in this field has been, therefore, to provide a freshly brewed cup of coffee made from ground, high quality, solid coffee. The provision of an apparatus which solves this problem is therefore a principal object of this invention.

It is to be appreciated that apparatus capable of providing freshly brewed coffee in a quantity equivalent to a "cup" has utility aside and apart from the environment mentioned above. For example, such apparatus could be conveniently used in homes, restaurants, and other places where coffee, if brewed in large quantity, might stand around for a considerable period before consumption. By the same token, it is to be appreciated that the brewing of other beverages in the quantities indicated can be conveniently achieved through such apparatus.

I have found that optimum results are achieved in the brewing of coffee when the coffee grounds are subjected to extraction by water at a temperature just below the boiling point. Where the extraction is being performed at an altitude near sea level, the temperature contemplated is of the order of 205° F. Another object of the invention is to provide an apparatus which includes means for maintaining the extracting chamber at about a temperature slightly below the boiling point of the water used for extraction. Still another object is to provide beverage-brewing apparatus which is adapted to dispense cup-sized quantities sequentially and with only a small interval of time intervening. As such, the apparatus here presented in an illustrated embodiment is an improvement of my copending application Serial No. 680,184, filed August 26, 1957, and reference is hereby made to that application, particularly for the general arrangement of a brewing chamber in an automatic vending machine which could be utilized in the practice of this invention. Other objects and advantages of this invention can be seen as this specification proceeds.

This invention will be explained in conjunction with the accompanying drawing, in which—

Fig. 1 is an elevational view partly in section of apparatus embodying teachings of the invention;

Fig. 2 is a cross-sectional view of the apparatus seen in Fig. 1 and is taken along the line 2—2 of Fig. 1; and Fig. 3 is a fragmentary elevational view of the apparatus seen in Figs. 1 and 2 as would be viewed from a position designated by the line 3—3 of Fig. 2.

In the illustration given, the numeral 10 designates generally an insulated enclosure for a coffee-brewing unit. The enclosure is generally rectangular in nature, as can be appreciated from a comparison of Figs. 1 and 2, the view in Fig. 2 showing the length and height of the enclosure 10, while Fig. 1 shows the width and height. Mounted atop enclosure 10 is a hopper, generally designated 11, and which is adapted to hold solid, ground coffee. Enclosure 10 is equipped with a pair of apertures 12 and 12a in the top wall thereof which permit the introduction of ground coffee into enclosure 10. In the illustration given, two brewing chambers are provided that operate alternately so that the time between dispensing successive cups of coffee is materially reduced. As will be developed hereinafter, the mechanism associated with each brewing chamber is for the most part identical so that for the sake of clarity, corresponding elements of one mechanism will be designated by the same numeral as the elements in the other mechanism except for the addition of an "a." Hence, one opening or passage is designated 12 and the other 12a.

The bottom of hopper 11 is equipped with a pair of funnels 13 and 13a which are aligned with and extend partially into openings 12 and 12a in enclosure 10. The bottom wall of hopper 11 is apertured as at 14 and 14a. Spaced below the bottom wall 15 of hopper 11, which is equipped with openings 14 and 14a, is a second wall 16 equipped with openings 17 and 17a which are laterally offset from openings 14 and 14a respectively. Interposed between walls 15 and 16 are rotatable discs 18 and 18a which are equipped with passages 19 and 19a, respectively, extending therethrough. By rotating discs 18 and 18a by means not shown, the openings 19 and 19a therein can be brought selectively into register first with openings 14 and 14a and thereafter with openings 17 and 17a so as to withdraw a metered quantity of ground coffee from hopper 11 and discharge the same through funnels 13 or 13a, as the case may be. In the condition of the elements shown in Fig. 1, ground coffee has previously been discharged through opening 17a while rotation of disc 18 will permit discharge of coffee through opening 17 into the brewing chamber associated with the funnel 13.

Referring now to Fig. 2, it is seen that the insulated rear wall 20 of enclosure 10 is apertured as at 21 for the admission of air. Wall 20 is constructed of inner and outer liners of sheet metal, with an intermediate layer of insulating material such as glass fiber. Mounted in wall 20 is a blower 22 driven by a motor 23 mounted in a casing 24 secured to wall 20. Casing 24 is equipped with an opening 25 which permits air to be drawn in over motor 23 and thence into wall 20 through aperture 21. A portion of wall 20 is not filled with insulation, as at 26, so that air is forced thereinto under the influence of blower 22 and eventually enters enclosure 10 through apertures 12 and 12a, as indicated by the arrows in Fig. 2. A portion of the shaft 27 of blower 22 is extended through the inner liner of wall 20 and carries a second blower wheel 28. An apertured casing 29 is secured within enclosure 10 and about blower wheel 28. The operation of blower wheel 28 serves to circulate air within enclosure 10, while the operation of the blower 22 in directing air through openings 12 and 12a prevents the rising of steam or water vapor upwardly into possible contact with the hopper and the ground coffee contained therein. Mounted interiorly of the inclosure 10 is a heating element 110 (see Fig. 2).

The remaining walls of enclosure 10 are similarly insulated, the front wall 30 being removable to provide access to the interior of enclosure 10. The bottom wall 31 is equipped with a pair of pivotally mounted doors 32 and 32a which are opened at the end of each brewing cycle to permit gravity discharge of spent coffee grounds, as will be hereinafter described. For this purpose, door 32 (as seen in Fig. 2) is equipped with an upstanding lug 33. Door 32 is shown in the open condition in solid line, and the closed position in dotted line, in Fig. 2. Lug 33, as seen in dotted line, is generally L-shaped and is pivotally connected to a linkage member 34, linkage member 34 in turn being pivotally connected to a second linkage member 35 which is pivotally mounted as at 36 on a frame 37. Frame 37 is removably supported within enclosure 10 by being supported between rails 38 secured to the side walls of enclosure 10. A spring 39 is secured between lug 33 and the rear wall 20 of enclosure 10, which tends to maintain door 32 in a closed condition. However, spring 39 permits door 32 to move outwardly a slight distance to relieve any internal pressure built up within enclosure 10 by virtue of air being drawn in through opening 25 of casing 24.

A back plate 40 is provided on frame 37 which supports water valves 41 and 41a (seen best in Fig. 3). Each valve 41 and 41a receives heated water from a source (not shown) through conduit 42 which is equipped with flexible branches 43 and 43a. Leading from each valve is a second flexible conduit 44 and 44a respectively, which communicates with a brewing chamber, 45 or 45a, in enclosure 10. A portion of the conduit 44a communicating with chamber 45a can be seen in Fig. 1.

Brewing chambers 45 and 45a are provided by tubular passageways defined by walls 46 and 46a in frame 37. For this purpose, frame 37 is equipped with a horizontally extending flange portion 47 (seen only in Fig. 2) in which a short length tubing providing walls 46 and 46a is mounted. The tubing providing walls 46 and 46a is equipped at its upper end with an annular bead, as at 48 and 48a, which permits the tubing defined by walls 46 and 46a to rest on the portion 47. The chambers 45 and 45a are vertically aligned with openings 12 and 12a and doors 32 and 32a. Each chamber is equipped with movable top and bottom closures, the top closures being designated 49 and 49a, while the bottom closures are designated 50 and 50a. Thus, it will be seen that coffee issuing from funnel 13 will enter chamber 45 when top closure 49 is open and the spent grounds will be dispensed from chamber 45 through door 32 when the bottom closure 50 and the door 32 are open.

The means provided in the illustration given for opening and closing the top and bottom closures includes a shaft 51 which is journaled for rotation in frame 37. For this purpose, frame 37 is equipped with bushings 52 and enclosure 10 is equipped with a sealing collar 53 (seen only in Fig. 1). Shaft 51 (as seen in Fig. 1) extends outwardly of enclosure 10 and is adapted to be driven by a motor (not shown). The extended portion of shaft 51 is equipped with a slot 54 into which a pin 55 of a spring-urged coupling 56 is mounted. The coupling 56 can be conveniently provided on a motor shaft, and by withdrawing pin 55 from slot 54 the motor can be disconnected from the shaft 51 for removal. Alternatively, shaft 51 may terminate interiorly of enclosure 10, and coupling 56 be positioned within enclosure 10 so that by disconnecting coupling 56 from shaft 51, frame 37 is readily removable from enclosure 10.

Shaft 51 is equipped with a pair of cams 57 and 57a which are rigidly fixed thereto. Thus, as shaft 51 is rotated, cams 57 and 57a are also rotated.

As can be seen best in Fig. 2, the bottom closure 50 of chamber 45 is mounted on an arm 58 which is pivotally mounted on frame 37, as at 59. The counterpart of arm 58 for chamber 45a is designated 58a and is seen in cross-section in Fig. 1. The arm is essentially channel-shaped in cross-section and is pivoted intermediate its ends, as can be seen in Fig. 2. The bottom closure 50 or 50a, as the case may be, is carried at one end of the arm 58 or 58a, while the other end of the arm is pivotally connected to a pair of springs 60, as at 61. The counterparts of these springs for the brewing chamber designated 45a are indicated by the numerals 60a, and their pivotal connection by the numeral 61a in Fig. 1.

An arm similar to arm 58 is provided for the top closure and is designated by the numeral 62. The upper ends of springs 60 are pivotally connected to one end of arm 62, as at 63, the springs 60a being similarly connected as at 63a (best seen in Fig. 3). Arm 62 is pivotally mounted on frame 37, as at 64 (see Fig. 2). Each arm carries a cam follower roller (65 in the case of arm 58, and 66 in the case of arm 62) which bears against cam 57 and operates to position the top and bottom closures 49 and 50 in an open or closed position, depending upon the portion of the cam contacted by the roller. For example, in Fig. 2, the cam follower roller 65 associated with the lower closure arm 58 is in contact with a depressed portion of cam 57 so that bottom closure 50 is open, and this is shown by the solid line designation of lower closure 50. Correspondingly, the upper arm cam follower roller 66 is shown bearing against a portion of the cam that urges the top closure 49 into a closed and sealing relationship with chamber 45. As cam 57 rotates (the rotation being clockwise, as seen in Fig. 2), it is to be appreciated that first the bottom closure is opened and thereafter the top closure opened, but that at certain positions of cam 57 both closures are in a closed position. During the closing of the bottom closure, the top closure is being opened due to the peripheral contour of the cam shown.

Also pivotally mounted on frame 37 are a pair of spouts 67 and 67a. Spouts 67 and 67a are vertically aligned with the top openings 12 and 12a in enclosure 10, and the chambers 45 and 45a, and are interposed therebetween. Thus, ground coffee being delivered through funnel 13 is confined with spout 67 in its downward path into chamber 45 and any tendency of the ground coffee to spread out or spray is inhibited. Here, it is to be appreciated that the conservation of the ground coffee being delivered by the hopper to the brewing chamber is important inasmuch as only about ¼ ounce of coffee is delivered at a time—that quantity being all that is necessary for the brewing of a single-cup quantity of liquid coffee.

Referring now to Fig. 2, spout 67 is shown in a condition out of alignment with chamber 45 when the solid line element is considered. Spout 67 is also shown in dotted line and in this condition is aligned for directing coffee from funnel 13 into chamber 45. Consistent with this, the top closure 49 is shown in an open position in dotted line, and a closed position in solid line. Pivoting of spout 67 from the solid line position to the dotted line position is effected by the movement of top closure 49 from the solid line position to the dotted line position, and specifically through the action of shaft extension 68, this extension being the shaft on which cam follower roller 66 is mounted and on which springs 60 are connected, as at 63. Shaft extension 68 and its counterpart 68a operate against rocker arms 69 and 69a which are pivotally mounted on shaft 70 of frame 37, shaft 70 being seen in Fig. 3. One end of rocker arm 69 is attached to spout 67 by means of a spring 71. A corresponding spring 71a is provided for connecting rocker arm 69a with spout 67a. The upper end of rocker arm 69 is also secured to a portion of frame 37 by means of spring 72, a corresponding spring 72a being seen in Fig. 3 for rocker arm 69a. Each spout 67 and 67a is equipped with a stop element 73 and 73a which abuts a frame stop element 74 and 74a, respectively, when the spout is vertically oriented.

The shaft 51 additionally carries a cam element 75 which in turn supports a cam roller 76. Cam roller 76 is operative to engage second linkage member 35 to open door 32 in order to discharge spent coffee grounds from chamber 45. A similar cam element and roller assembly is provided for door 32a, but is omitted from the drawing for the sake of clarity.

Each closure is provided with a gasket-screen element, as can be seen in the broken-away portion of lower closure 50 seen in Fig. 2. The lower closure 50 includes a metal disc 77 to which is applied an annular rubber collar 78 having a screen 79 mounted thereacross. Liquid entering the depending nipple 80 of closure 50 must therefore pass through screen 79 in its circulatory path through chamber 45 before it exits through a similar nipple 81 with which the top closure 49 is equipped. A baffle element 82 is attached to metal disc 77 and extends over nipple 80 so as to divert liquid flowing into chamber 45 and thus prevent channelling.

In the operation of the device, when cam 57 is in the position shown in Fig. 2, the bottom closure 50 is open, permitting discharge of extracted coffee grounds which is aided by the slight quantity of water remaining in conduit 44, as well as the liquid coffee remaining in nipple 81. At this time, the top closure 49a of chamber 45a is open, with the bottom closure 50a being closed. Further rotation of shaft 51 closes the top closure 49a of chamber 45a, chamber 45a previously having been charged with a quantity of ground coffee. Further rotation of shaft 51 causes the top closure 49 of chamber 45 to open, while the bottom closure 50 of chamber 45 closes. The opening of top closure 49 is accompanied by the pivoting of spout 67 into a vertical position. The disc 18 is simultaneously rotated to bring its passage 19 into register with opening 17 in the lower wall 16 so that coffee is introduced into chamber 45. Further rotation of shaft 51 closes the top closure 49 of chamber 45 and opens the bottom closure 50a of chamber 45a, permitting discharge of its contents. The opening of the respective bottom closures 50 and 50a of the two chambers is accompanied by actuation of the linkage associated with the doors 32 and 32a, respectively.

The employment of springs for the chamber closures along with the residual water remaining in the conduits leading to and from the chambers provides for a rapid and thorough discharge of the spent coffee grounds. Here, it is to be appreciated that only a small quantity of both solid coffee and water is employed in the brewing of a single-cup quantity. Slightly in excess of ¼ ounce of coffee is employed while 5 to 6 ounces of water may be satisfactorily employed. The introduction of the brewing water through the bottom closure and against a baffle plate not only avoids undesirable channelling which would defeat the full extractive process desired, but additionally avoids any problem of trapping air in the chamber which would result in coffee being dispensed in slugs. The employment of the gasket-screen element for each closure further cooperates in avoiding undesirable channelling, while preventing the adherence of coffee grounds to the closure.

In a typical operation of the device when employed in conjunction with an automatic vending machine, the insertion of a coin into the machine would operate a relay, the relay functioning to open hot water valve 41 (this assuming that chamber 45 is the one that has previously been charged with solid coffee). The relay would also start a cup dispenser and would actuate a hopper motor to load the now-idle chamber 45a. The relay further can be employed to lock out the coin mechanism during the vending cycle. The hot water valve 41 allows 5 or 6 ounces of 205° F. water to pass through chamber 45, the liquid coffee issuing through nipple 81 which communicates through tubing (not shown) to a coffee cup positioned in an accessible position for removal from the machine.

The relay can also be employed to actuate a timing mechanism which starts the motor employed to turn shaft 51, the shaft commencing to turn when valve 41 is closed. Rotation of shaft 51 opens bottom 50 of chamber 45, flushing with about one ounce of water left in the conduit line 44 from valve 41 to chamber 45. The opening of bottom closure 50 is accompanied by the opening of door 32 which permits the spent coffee grounds to be discharged to a receptacle or drain (not shown). The further rotation of shaft 51 closes bottom closure 50 and opens the top closure 49 of chamber 45. Just prior to the closing of bottom closure 50 of chamber 45, the top closure 49a of chamber 45a is closed and is in a ready condition. When a subsequent coin is inserted, the relay provides for circulation of hot water from valve 41a to chamber 45a. Meanwhile, the hopper charges chamber 45 which will be ready for brewing, the top closure 49 of chamber 45 being closed during the circulation of water for brewing through chamber 45a. Thus, by the invention disclosed herein, coffee can be retained in the hopper until just prior to the time it is needed for brewing.

While in the foregoing specification a detailed description of an embodiment of the invention has been shown for the purpose of illustration, those skilled in the art will perceive many variations in the details thereof without departing from the spirit and scope of the invention.

I claim:

1. In apparatus for brewing single-cup quantities of coffee, an insulated enclosure, means for heating the interior of said enclosure, a pair of brewing chambers mounted within said enclosure, each chamber being equipped with openable top and bottom closures, upper and lower passage-providing means in said enclosure aligned with said top and bottom closures, coffee hopper means above said enclosure operative to discharge fresh coffee particles through said upper passage-providing means into said chambers, openable doors closing said lower passage-providing means, a shaft rotatably mounted in said enclosure, cam means on said shaft operative to sequentially open the top and bottom closures of each chamber, said cam means also being operative to sequentially maintain the closures of said chambers closed for brewing, said closures being equipped with flow fittings, hot water supply conduit means communicating with the said bottom closure fittings, liquid coffee discharge conduit means communicating with the top closure fittings, said cam means being operative to open said doors when said bottom closures are open whereby liquid in said conduit means is effective to flush said chambers of spent coffee particles and convey the same through said doors.

2. The structure of claim 1 in which said enclosure is equipped with blower means, air flow passage means communicating said blower means with said upper passage-providing means and effective to introduce air into said enclosure therethrough, said doors being equipped with means urging the same to closed position but effective to relieve internal air pressure in said enclosure.

3. The structure of claim 1 in which said enclosure is equipped with a fresh coffee particle delivery tube for each chamber, each of said tubes being pivotally mounted for cooperative action with said top closures for directing fresh coffee particles into the associated chamber, said tubes being operatively connected to said cam means.

4. In coffee-brewing apparatus adapted to sequentially brew single-cup quantities, an insulated enclosure, means for maintaining the interior of the enclosure just below the boiling point of water, aligned upper and lower openings in said enclosure adapted respectively to introduce fresh coffee particles into said enclosure and discharge spent coffee particles from said enclosure, a frame removably mounted in said enclosure providing a chamber aligned with said openings, a shaft journalled for rotation in said frame and carrying cam means thereon, said chamber being equipped with movable top and bottom closures, said closures being actuated by said cam means, means for introducing fresh coffee particles into said chamber when said top closure is open and said bottom closure is closed, each of said closures being equipped with a flow passage therethrough, and means for flowing heated water upwardly through said chamber when both of said closures are closed.

5. The structure of claim 4 in which said shaft extends outwardly of said enclosure to provide a portion thereof adapted to be driven from outside said enclosure.

6. The structure of claim 4 in which said closures are equipped with cam follower means and equipped with spring means coupling said closures to said frame, urging of said spring means being opposed by the cooperation of said cam means and said cam follower means.

7. The structure of claim 6 in which said lower opening is equipped with a door, said door being equipped with a linkage cooperating with said cam means for opening said door, a spring coupling said door with said frame and effective to urge said door to closed position.

8. In coffee-brewing apparatus adapted to brew single-cup quantities, an insulated enclosure, a hopper for fresh coffee particles positioned above said enclosure and adapted to discharge said particles into said enclosure by gravity through opening means therein, means in said enclosure for maintaining an elevated temperature therein, a frame removably mounted in said enclosure, said frame being equipped with a pair of brewing chambers having openable top and bottom walls, said chambers being vertically aligned with said opening means and arranged in side-by-side relation, means for introducing heated water into each of said chamber bottom walls and withdrawing liquid coffee from each of said top walls, door means in said enclosure positioned below said chambers, said frame rotatably supporting a shaft equipped with a cam for each of said chambers, means for rotating said shaft, each of said walls being pivotally mounted on said frame with spring means extending between said walls and said frame operative to urge said walls to open position, said walls being equipped with cam followers operable by said cams for closing said walls, a spout member for each chamber pivotally mounted on said frame, connecting means coupling each spout member with the top wall of its associated chamber whereby opening of said top walls is accompanied by pivotal movement of said support members, linkage means on said door means extending inwardly of said enclosure, cam means on said shaft engageable with said linkage means for opening said door means, and spring means between said linkage means and said frame urging said door means to a closed position.

9. The structure of claim 8 in which said connecting means includes a spring member for each spout member, said frame and spout members being equipped with stop means effective to limit the action of said spring members in pivoting said spout members when said top walls are opened by said cams.

10. The structure of claim 8 in which said enclosure includes an air flow passage in a wall thereof communicating with said enclosure opening means, blower means on said enclosure communicating with said air flow passage for delivering air into said enclosure opening means.

References Cited in the file of this patent
UNITED STATES PATENTS

| | | |
|---|---|---|
| 1,390,008 | Arduino | Sept. 6, 1921 |
| 1,467,778 | Paola | Sept. 11, 1923 |
| 1,804,795 | Lee | May 12, 1931 |
| 1,903,111 | Harper | Mar. 28, 1933 |
| 2,517,073 | Alvarez | Aug. 1, 1950 |
| 2,569,820 | Locke | Oct. 2, 1951 |
| 2,626,785 | Lewis et al. | Jan. 27, 1953 |
| 2,655,858 | Hamlin | Oct. 20, 1953 |
| 2,702,000 | Renner | Feb. 15, 1955 |
| 2,827,845 | Richeson | Mar. 25, 1958 |
| 2,838,077 | Cooper | June 10, 1958 |